(12) United States Patent
Wu et al.

(10) Patent No.: US 7,343,048 B2
(45) Date of Patent: Mar. 11, 2008

(54) EDGE BASED ALIGNMENT ALGORITHM

(75) Inventors: Donghui Wu, Fremont, CA (US); Yushan Huang, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 727 days.

(21) Appl. No.: 10/666,691

(22) Filed: Sep. 18, 2003

(65) Prior Publication Data
US 2005/0063610 A1    Mar. 24, 2005

(51) Int. Cl.
G06K 9/64 (2006.01)
G06K 9/40 (2006.01)
(52) U.S. Cl. .............. 382/260; 382/278; 382/260
(58) Field of Classification Search ........ 382/199, 382/266, 269, 294, 278
See application file for complete search history.

(56) References Cited

U.S. PATENT DOCUMENTS

| | | | | |
|---|---|---|---|---|
| 5,065,440 A | * | 11/1991 | Yoshida et al. | 382/219 |
| 5,605,440 A | * | 2/1997 | Bocoviz et al. | 415/200 |
| 5,694,487 A | * | 12/1997 | Lee | 382/201 |
| 5,878,151 A | * | 3/1999 | Tang et al. | 382/103 |
| 6,516,087 B1 | * | 2/2003 | Camus | 382/154 |
| 2002/0063893 A1 | * | 5/2002 | Fujieda | 358/1.15 |

FOREIGN PATENT DOCUMENTS

GB       2316255 A  *  2/1998

\* cited by examiner

*Primary Examiner*—Jingge Wu
*Assistant Examiner*—Jayesh A Patel
(74) *Attorney, Agent, or Firm*—Patent Law Group LLP; David C. Hsia (57) ABSTRACT

A method for aligning images includes (1) selecting a pair of overlapping pixels when two second image are aligned with a camera motion; (2) if both pixels are edge pixels, incrementing a correlation value between the two images for the camera motion; (3) if only one of pixels is an edge pixel, decrementing the correlation value between the two images for the camera motion; (4) repeating steps (1) to (3) for other pairs of overlapping pixels in the two images to determine the correlation value for the camera motion. The method further includes (5) repeating steps (1) to (4) for other camera motions; (6) selecting camera motions having large correlation values; (7) determining matched edge counts for members of the group; (8) selecting the camera motion with the largest matched edge count; and (8) aligning the two images with the selected camera motion.

17 Claims, 5 Drawing Sheets

EDGE BASED ALIGNMENT ALGORITHM

FIELD OF INVENTION

This invention relates to methods for aligning images.

DESCRIPTION OF RELATED ART

When a photographer captures a scene using a camera, the desired field of view may be larger than the normal field of view of the camera. Digital photography allows a panoramic image to be produced without the need of purchasing special equipment such as a panoramic camera or fisheye lenses. For example, a photographer with a digital camera may capture a series of digital pictures of a scene by rotating the camera and taking pictures in a sequence. The captured images may then be stitched together to produce a panoramic picture of the scene. Similarly, film-based photographs can be digitized, and the panoramic picture can be composed by stitching together the digitized images. Presently, digital image programs are available for stitching multiple digital images together to form a panoramic picture. Exemplary programs include Ulead Cool 360®, Live Picture PhotoVista®, and MGI PhotoSuite III®.

Thus, what is needed is a method for aligning images.

SUMMARY

In one embodiment of the invention, a method for aligning images includes (1) selecting a pair of overlapping pixels when two images are aligned with a camera motion; (2) if both pixels are edge pixels, incrementing a correlation value between the two images for the camera motion; (3) if only one of the pixels is an edge pixel, decrementing the correlation value between the two images for the camera motion; (4) repeating steps (1) to (3) for other pairs of overlapping pixels in the two images to determine the correlation value for the camera motion. The method further includes (5) repeating steps (1) to (4) for other camera motions; (6) selecting camera motions having large correlation values; (7) determining matched edge counts for members of the group; (8) selecting the camera motion with the largest matched edge count; and (8) aligning the two images with the selected camera motion.

DETAILED DESCRIPTION

Figure 1:
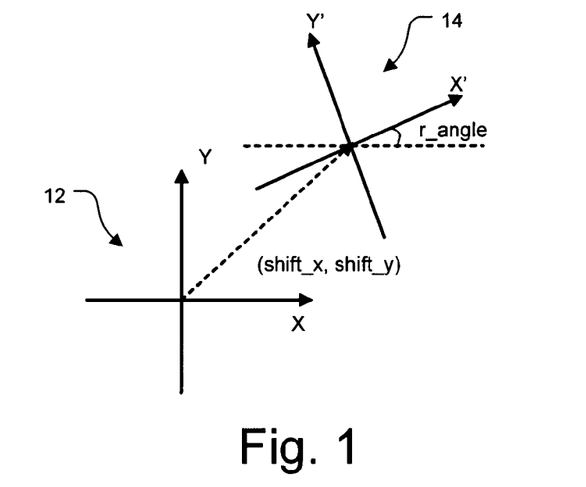
FIG. 1 is a camera motion between two images in one embodiment of the invention.

FIG. 1 illustrates an example of a camera motion. A panoramic program typically includes an alignment algorithm that estimates the camera motion by searching for the best correlation between two images. Assuming the camera motion between images 12 and 14 is translation and rotation in the image plane, the motion can be described by a three value motion vector: [shift_x, shift_y, r_angle], where (shift_x, shift_y) is the translation vector and r_angle is the angle of rotation. In FIG. 1, (X, Y) are the axes of image 12, (X', Y') are the axes of image 14, and the origin of each image is defined at the center of the image. Pixel coordinates between the two images can be transformed using Equation 1.0 listed below.

$$x' = x \cos(r\_angle) + y \sin(r\_angle) + shift\_x$$

$$y' = -x \sin(r\_angle) + y \cos(r\_angle) + shift\_y' \quad \text{Eqn 1.1}$$

wherein (x, y) are the coordinates of a point in image 12, (x', y') are the coordinates of a corresponding point in image 14.

Assuming that a range of the camera motion is known, the alignment algorithm can search in this range for the best correlation between the two images to recover the camera motion. One conventional way to define image correlation is as follows:

$$Corr = \frac{1}{N} \sum_{px \in W} |I(p) - I'(p')|, \quad \text{Eqn. 1.2}$$

wherein Corr is the correlation value, W is the overlapping region between a first image and a second image, p is a pixel in the first image located in the overlapping region, p' is the overlapping pixel of p in the second image, I( ) is the pixel value, and N is the number of pixels in the overlapping region W. Equation 1.2 can be rewritten for a color image as follows:

$$Corr = \frac{1}{N} \sum_{px \in W} (|R(p) - R'(p')| + |G(p) - G'(p')| + |B(p) - B'(p')|), \quad \text{Eqn. 1.3}$$

wherein R( ), G( ), and B( ) are the RGB pixel values. Equations 1.2 and 1.3 may not able to correctly resolve image correlation in all practical situations.

Listed below are some practical situations that any image correlation definition must resolve correctly in actual use.

Moving Object in the Scene

In some situations, there are moving objects such as people and vehicles in the scene. These moving objects make the overlapping region between the images dissimilar.

Luminance Change in the Images

In some situations, the luminance will change between the images. Although some cameras provide a panoramic mode, which ensures that the exposure and the focus remain fixed while the camera is in this mode, some slight changes in the luminance still exist in the images.

Multiple Solutions in Alignment

In some situations, there are ambiguities that result in more than one possible solution for image correlation. The ambiguity is mainly caused by the fact that the images form only part of the whole scene.

Figure 2A:
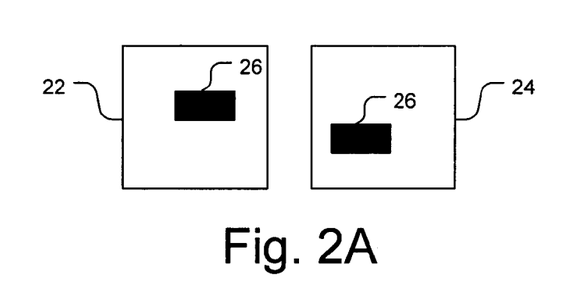
FIGS. 2A, 2B, and 2C illustrate possible alignments of two images in one embodiment of the invention.
Figure 2B:
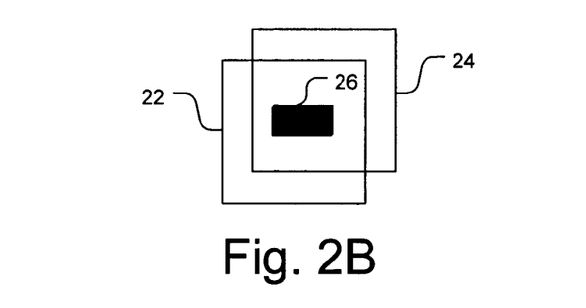
Figure 2C:
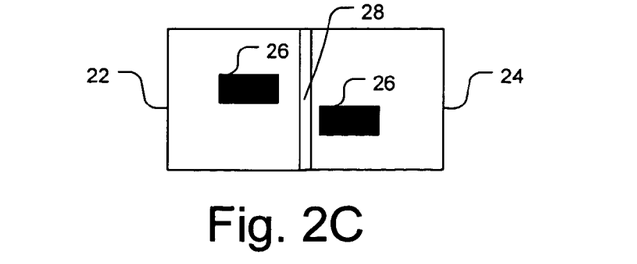

FIG. 2A illustrates one example of matching ambiguity where an image 22 and an image 24 both include a block 26. FIGS. 2B and 2C offer two possible solutions for correlating the images using equation 1.2. In the first solution shown in FIG. 2B, block 26 is matched in both images. In the second solution shown in FIG. 2C, an overlapping region 28 is matched in both images. Although two solutions are possible, experience shows that most users will choose the first solution because it matches the object rather than the background. This rule is hereafter referred to as "matching object not background."

Figure 3A:
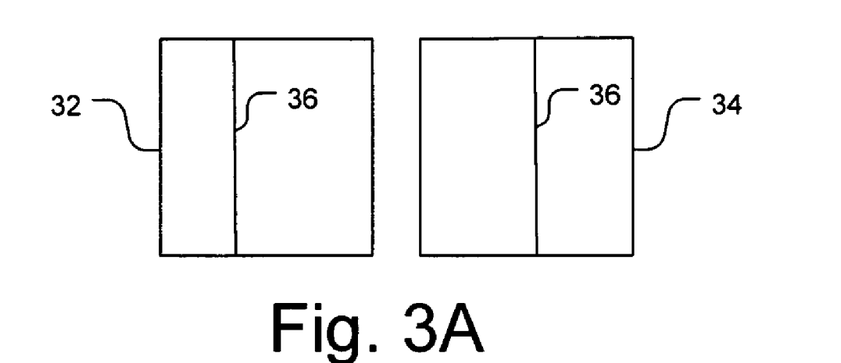
FIGS. 3A, 3B, and 3C illustrate possible alignments of two images in one embodiment of the invention.
Figure 3B:
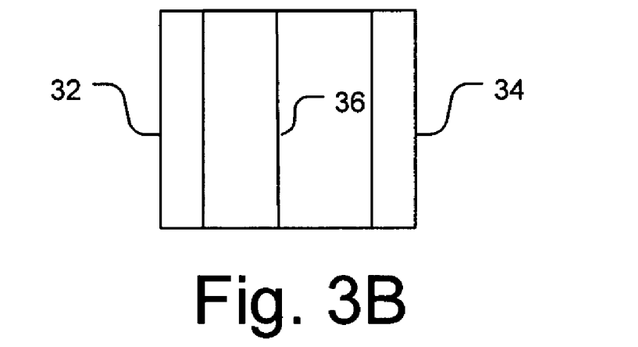
Figure 3C:
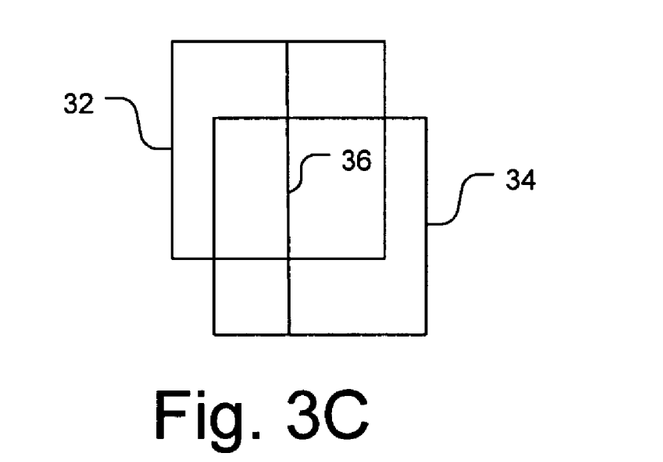

FIG. 3A illustrates another example of matching ambiguity where an image 32 and an image 36 both include an edge 36. FIGS. 3B and 3C offer two possible solutions for correlating the images using equation 1.2. In the first solution shown in FIG. 3B, the entire edge 36 overlaps in both images. In the second solution shown in FIG. 3C, only part of edge 36 overlaps in both images. Experience shows that most users will chose the first solution because it matches the most edge points. This rule is hereafter referred to as "matching more objects if possible."

Figure 4:
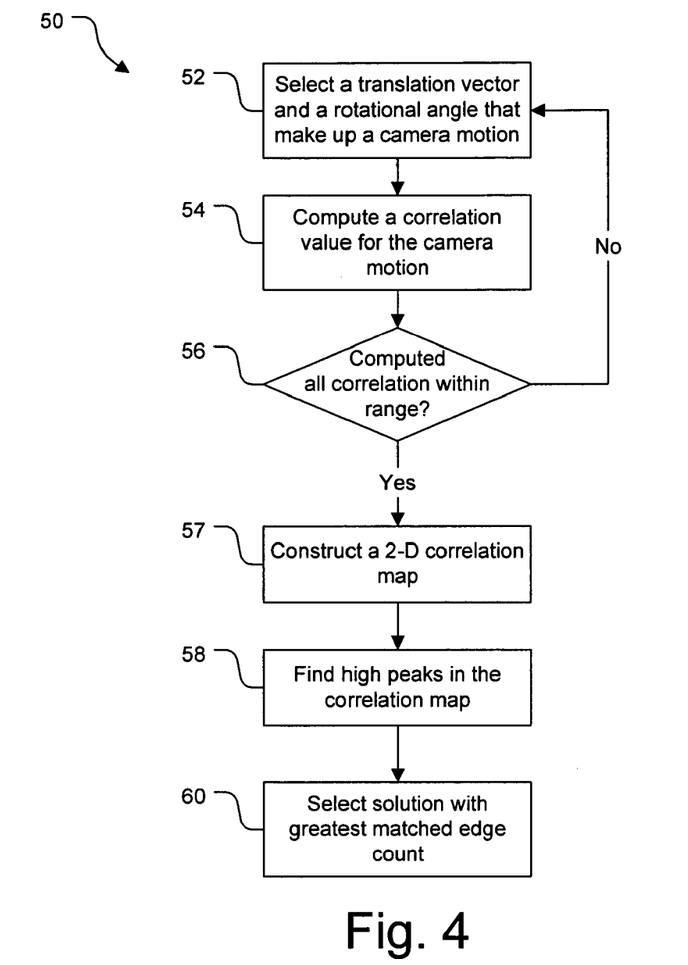
FIG. 4 illustrates a method for determining image correlation in one embodiment of the invention.

FIG. 4 is a flowchart of a method 50 for a panoramic program that provides a more robust definition of image correlation in one embodiment of the invention.

Figure 5:
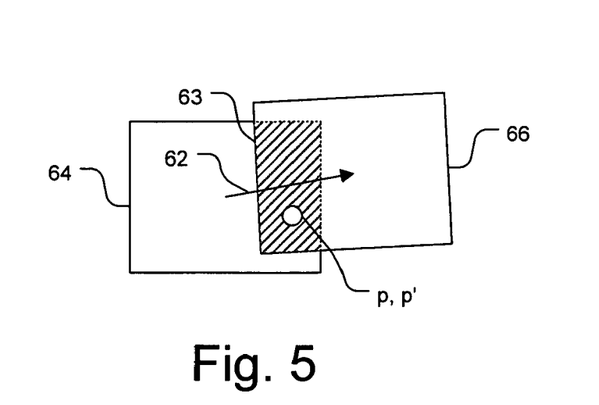
FIG. 5 illustrates two exemplary images to be aligned in one embodiment of the invention.

In step 52, the program selects a translation vector [shift_x, shift_y] and a rotation angle r_angle that make up a camera motion. The translation vector [shift_x, shift_y] is selected within a range of [minx, maxx] by [miny, maxy], and the rotation angle is selected within a range of [minr, maxr]. Together, [minx, maxx], [miny, maxy], and [minr, maxr] define a range of camera motions that will be searched for the camera motion that produces the best correlation between the two images. In one example shown in FIG. 5, the program selects a camera motion 62 that creates an overlaps 63 between images 64 and 66.

In step 54, the program computes a correlation value between a first image and a second image when they are aligned with the camera motion in this iteration. A method for calculating the correlation value is described later in reference to FIG. 7.

In step 56, the program determines if it has calculated correlation values for the range of camera motions. If so, step 56 is followed by step 57. Otherwise step 56 is followed by step 52 and method 50 repeats until the correlation values for the range of camera motions have been determined.

Figure 6:
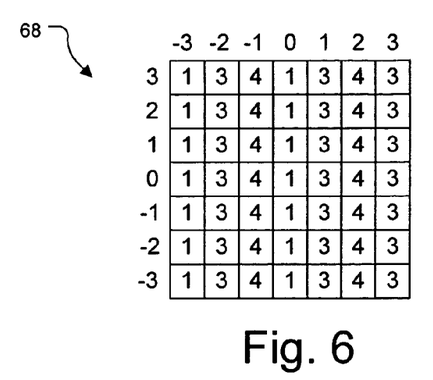
FIG. 6 illustrates a correlation map for made by the method of FIG. 4 in one embodiment of the invention.

In step 57, the program constructs a 2-D correlation map 68 (FIG. 6). The axes of map 68 are the values of the translation vectors of the camera motions. The points in map 68 are the correlation values of the corresponding translation vectors. For all the camera motions having the same translation vector but different rotation angle, the program only maps the motion vector that has the largest correlation value. In other words, $$\text{Corr\_Map}[x, y] = \underset{r \in [\min r, \max r]}{\text{MAX}}(Corr(x, y, r)), \quad \text{Eqn. 2}$$

wherein Corr_Map is the mapped correlation value.

In step 58, the program selects "peaks" from map 68, and then selects "high peaks" from the peaks. A peak in map 68 is a camera motion that has a correlation value greater or equal to its neighboring points in map 68, and greater than at least one of its neighboring points in map 68.

In step 60, the program determines a matched edge count (MEC) for each of the high peaks and selects the camera motion with the greatest MEC. A method for calculating the MEC is described later in reference to FIG. 8.

Figure 7:
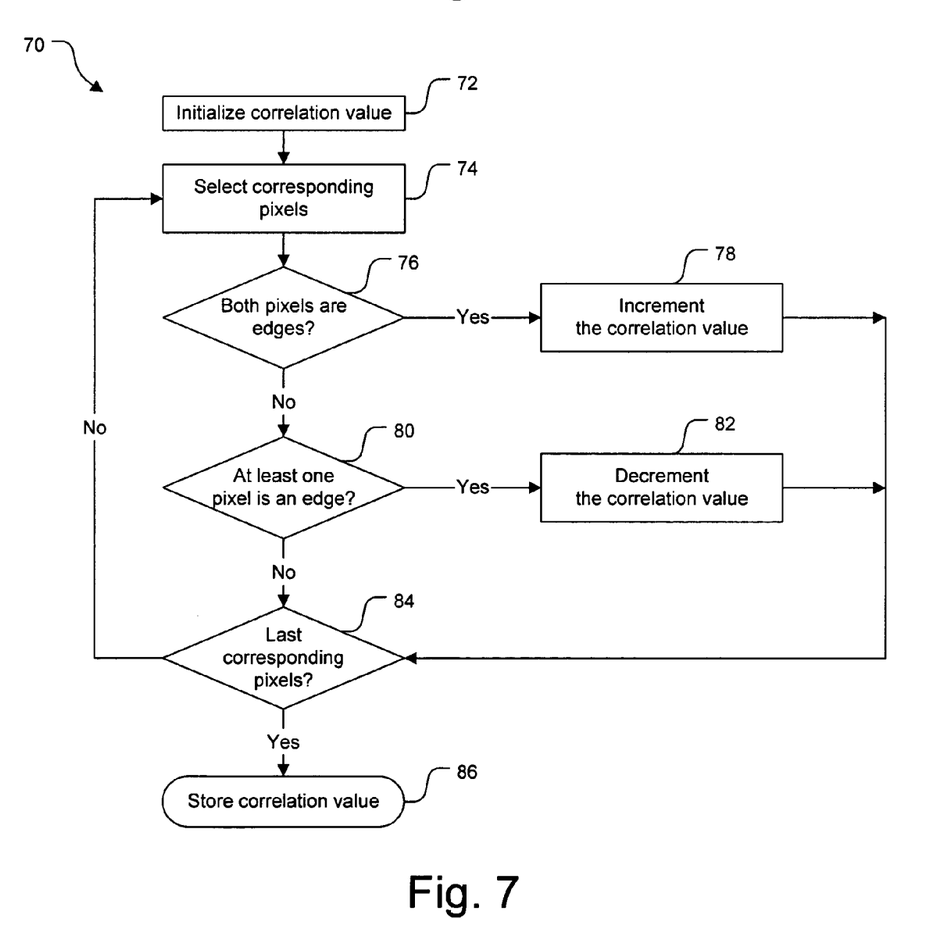
FIG. 7 illustrates a method for calculating a correlation value between two images in one embodiment of the invention.

FIG. 7 is a flowchart of a method 70 for the panoramic program to calculate the correlation value by matching edges between two images aligned with a selected camera motion in one embodiment of the invention.

In step 72, the program initializes a correlation value Corr to zero.

In step 74, the program selects a pair of overlapping pixels from the overlapping region of the two images if they were aligned with the camera motion selected in step 52 (FIG. 4). In the example shown in FIG. 5, pixels p and p' are overlapping pixels in overlapping region 63 between images 64 and 66.

In step 76, the program determines if both of the overlapping pixels are edge pixels. If so, step 76 is followed by step 78. Otherwise, step 76 is followed by step 80. The program can determine if the overlapping pixels are edge pixels by applying a first order differential edge detection filter such as a Sobel filter. In one embodiment, the Sobel filter is defined as:

$$g_x(x,y) = I(x+1,y-1) + 2I(x+1,y) + I(x+1,y+1) - I(x-1,y-1) - 2I(x-1,y) - I(x-1,y+1);$$

$$g_y(x,y) = I(x-1,y+1) + 2I(x,y+1) + I(x+1,y+1) - I(x-1,y-1) - 2I(x,y-1) - I(x+1,y-1);$$

$$G(x,y) = |g_x(x,y)| + |g_y(x,y)|; \quad \text{Eqn. 3}$$

wherein $g_x$ is the Sobel gradient in the x-direction, $g_y$ is the Sobel gradient in the y-direction, and G is the Sobel gradient in the x-direction and the y-direction. If gradient G(p) is greater than a threshold T, then pixel p is declared an edge pixel. If gradient G(p'), which is also written as G'(p') to distinguish it from G(p), is greater than a threshold T', then pixel p' is declared an edge pixel.

In step 78, the program increments the numerator of the correlation value because the overlapping pixels are likely to match when they are both edge pixels. In one embodiment, the correlation value is incremented by an edge orientation matching value derived from a second order differential edge detection filter such as a Laplace filter. In one embodiment, the edge matching value is defined as:

$$\frac{2L(p)L'(p')}{L^2(p) + L'^2(p')}, \quad \text{Eqn. 4}$$

wherein L(p) is a Laplace gradient of pixel p, and L'(p') is a Laplace gradient of pixel p', which can also be written as L(p'). In one embodiment, the Laplace filter is defined as follows:

$$L(x, y) = I(x, y) - \frac{1}{9} \sum_{i=-1}^{1} \sum_{j=-1}^{1} I(x+i, y+j). \quad \text{Eqn. 5}$$

The value of equation 4 is the largest when L(p) is equal to L'(p'), which occurs when the overlapping pixels are both edge pixels having the same edge orientation that defines what is inside and outside of the edge. Thus, the value of equation 4 is the largest when pixels p and p' are most likely to match. Step 78 is followed by step 84.

In step 80, the program determines if at least one of the overlapping pixels is an edge pixel. If so, then step 80 is followed by step 82. Otherwise step 80 is followed by step 84.

In step 82, the program decrements the numerator of the correlation value and increments the denominator of the correlation value because the overlapping pixels are not likely to match when only one of them is an edge pixel. In one embodiment, the program decrements numerator by ½ and increments the denominator by 1.

In step 84, the program determines if it has processed all the overlapping pixels in the overlapping region. If so, then step 84 is followed by step 86. Otherwise step 84 is followed by step 74 and the program cycles through method 70 until all the overlapping pixels have been processed.

In step 86, the program stores the correlation value for the selected camera motion.

In summary, the calculations of steps 76 to 82 (FIG. 7) can be summarized in the equations below:

$$Corr = \frac{\sum_{p \in W} f(L(p), L'(p'), G(p), G'(p'))}{\sum_{p \in W} h(G(p), G'(p'))}$$ Eqns. 6

$$f(L(p), L'(p'), G(p), G'(p')) = \begin{cases} \frac{2L(p)L'(p')}{L^2(p) + L'^2(p')}, & \text{if } G(p) > T \text{ AND } G'(p') > T' \\ -\frac{1}{2}, & \text{if } G(p) > T \text{ OR } G'(p') > T' \\ 0, & \text{else} \end{cases}$$

$$h(G(p), G'(p')) = \begin{cases} 1, & \text{if } G(p) > T \text{ OR } G'(p') > T' \\ 0, & \text{else} \end{cases}$$

Figure 8:
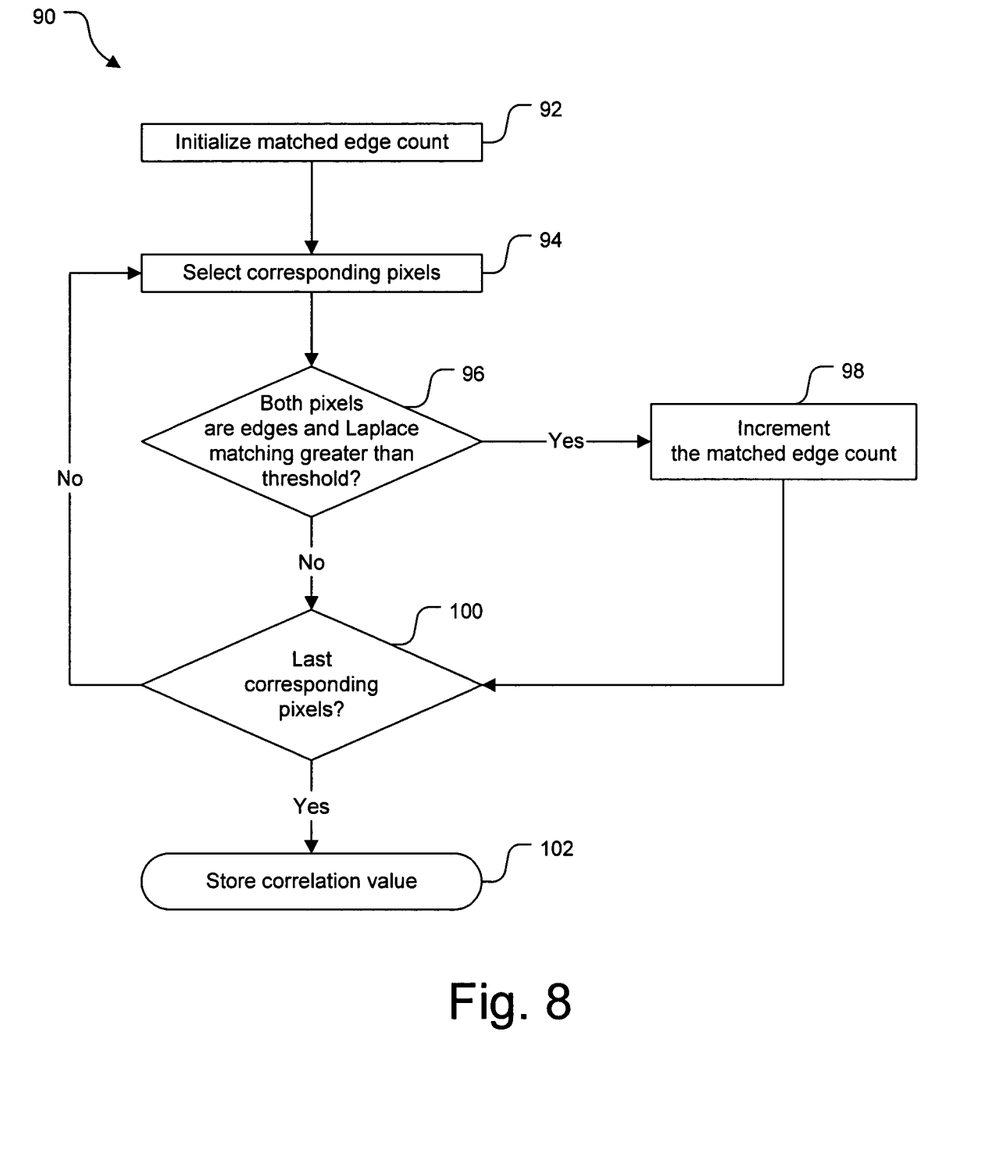
FIG. 8 illustrates a method for calculating matched edge count in one embodiment of the invention.

FIG. 8 is a flowchart of a method 90 for the panoramic program to calculate the MEC between two images aligned with a selected camera motion in one embodiment of the invention.

In step 92, the program initializes the value of MEC to zero.

In step 94, the program selects a pair of overlapping pixels from the overlapping region of the two images if they were aligned with the one of the camera motions selected in step 58 (FIG. 4).

In step 96, the program determines if both of the overlapping pixels are edge pixels and have an edge orientation matching value greater than a threshold. If so, step 96 is followed by step 98. Otherwise step 96 is followed by step 100.

In step 98, the program increments the MEC. In one embodiment, the program increments the MEC by 1. Step 98 is followed by step 100.

In step 100, the program determines if it has processed all the overlapping pixels in the overlapping region. If so, then step 100 is followed by step 102. Otherwise step 100 is followed by step 94 and the program cycles through method 90 until all the overlapping pixels have been processed.

In step 102, the program stores the MEC value for the selected camera motion.

In summary, the calculations of steps 96 and 98 (FIG. 7) can be summarized in the equations below:

$$MEC = \sum_{p \in W} k(L(p), L'(p'), G(p), G'(p'))$$ Eqns. 7

$$k(L(p), L'(p'), G(p), G'(p')) = \begin{cases} 1, & \text{if } G(p) > T \text{ AND } G'(p') > T' \text{ AND } \frac{2L(p)L'(p')}{L^2(p) + L'^2(p')} \geq \frac{1}{3} \\ 0, & \text{else} \end{cases}$$

Various other adaptations and combinations of features of the embodiments disclosed are within the scope of the invention. Numerous embodiments are encompassed by the following claims.

What is claimed is:

1. A method for aligning a first image and a second image, comprising:
    (1) selecting a first pixel in the first image and a second pixel in the second image that overlap when the first image and the second image are aligned with a camera motion;
    (2) if the first and the second pixels are edge pixels, incrementing a correlation value between the first image and the second image for the camera motion;
    (3) if only one of the first and the second pixels is an edge pixel, decrementing the correlation value between the first image and the second image for the camera motion;
    (4) repeating steps (1) to (3) for other overlapping pixels in the first image and the second image to determine the correlation value between the first image and the second image for the camera motion;
    (5) repeating steps (1) to (4) for other camera motions to generate correlation values for the other camera motions; and
    (6) selecting a group of the camera motions generating large correlation values.

2. The method of claim 1, wherein the camera motion includes a translation and a rotation.

3. The method of claim 1, further comprising determining if the first and the second pixels are edge pixels, said determining comprising:
    applying an edge detection filter to the first pixel to generate a first result;
    comparing the first result to a first threshold, wherein the first pixel is an edge pixel when the first result is greater than the first threshold;
    applying the edge detection filter to the second pixel to generate a second result; and
    comparing the second result to a second threshold, wherein the second pixel is an edge pixel when the second result is greater than the second threshold.

4. The method of claim 3, wherein the edge detection filter is a Sobel filter defined as:

$$g_x(x,y) = I(x+1, y-1) + 2I(x+1, y) + I(x+1, y+1) - I(x-1, y-1) - 2I(x-1, y) - I(x-1, y+1);$$

$g_y(x,y)=I(x-1,y+1)+2I(x,y+1)+I(x+1,y+1)-I(x-1,y-1)-2I(x,y-1)-I(x+1,y-1);$ $G(x,y)=|g_x(x,y)|+|g_y(x,y)|;$ wherein $g_x$ is a Sobel gradient in the x-direction, $g_y$ is a Sobel gradient in the y-direction, G is a Sobel gradient in the x-direction and the y-direction, and I is a pixel value.

5. The method of claim 1, wherein said incrementing a correlation value between the first image and the second image for the camera motion comprises:
determining an edge orientation matching value representing how closely the first pixel and the second pixel match in edge orientation; and
incrementing the numerator of the correlation value by the edge orientation matching value.

6. The method of claim 5, wherein said determining an edge orientation matching value comprises:
applying a second order differential edge detection filter to the first pixel in the first image to generate a first result;
applying the second order differential edge detection filter to the second pixel in the second image to generate a second result;
calculating the edge orientation matching value as follows:

$$\frac{2L(p)L'(p')}{L^2(p)+L'^2(p')},$$

wherein L(P) is the first result and L'(p') is the second result.

7. The method of claim 6, wherein the second order differential edge detection filter is a Laplace filter defined as:

$$L(x,y) = I(x,y) - \frac{1}{9}\sum_{i=-1}^{1}\sum_{j=-1}^{1} I(x+i, y+j),$$

wherein L is a Laplace gradient and I is a pixel value.

8. The method of claim 1, wherein said decrementing the correlation value between the first image and the second image for the camera motion comprises decrementing the numerator of the correlation value and incrementing the denominator of the correlation value.

9. The method of claim 1, wherein said selecting a group of the camera motions generating large correlation values comprises:
selecting each camera motion that has a correlation value (1) greater than or equal to its neighboring camera motions, and (2) greater than at least one of the neighboring camera motions.

10. The method of claim 1, further comprising:
(7) determining for each member of the group of the camera motions a matched edge count;
(8) selecting one camera motion having the largest matched edge count from the group of the camera motions; and
(9) aligning the first image and the second image according to the selected camera motion.

11. The method of claim 10, wherein the matched edge count is defined as:

$$MEC = \sum_{p \in W} k(L(p), L'(p'), G(p), G'(p'))$$

$$k(L(p), L'(p'), G(p), G'(p')) = \begin{cases} 1, & \text{if } G(p) > T \text{ AND } G'(p') > T' \text{ AND } \frac{2L(p)L'(p')}{L^2(p)+L'^2(p')} \geq \frac{1}{3} \\ 0, & \text{else} \end{cases}$$

wherein MEC is the matched edge count; W is an overlapping region between the first image and the second image under the camera motion; p and p' are overlapping points in the overlapping region from the first image and the second image, respectively; L(p) is a first Laplace gradient of the first point; L'(p') is a second Laplace gradient of the second point; G(p) is a first Sobel gradient of the first point; G'(p') is a second Sobel gradient of the second point; T is a first Sobel threshold for detecting an edge in the first image; and T' is a second Sobel threshold for detecting an edge in the second image.

12. A method for aligning a first image and a second image, comprising:
(1) generating a plurality of correlation values for a camera motion, the camera motion comprising a translation and a range of rotation after the translation, a correlation value being defined as:

$$Corr = \frac{\sum_{p \in W} f(L(p), L'(p'), G(p), G'(p'))}{\sum_{p \in W} h(G(p), G'(p'))}$$

$$f(L(p), L'(p'), G(p), G'(p')) = \begin{cases} \frac{2L(p)L'(p')}{L^2(p)+L'^2(p')}, & \text{if } G(p) > T \text{ AND } G'(p') > T' \\ -\frac{1}{2}, & \text{if } G(p) > T \text{ OR } G'(p') > T' \\ 0, & \text{else} \end{cases}$$

$$h(G(p), G'(p')) = \begin{cases} 1, & \text{if } G(p) > T \text{ OR } G'(p') > T' \\ 0, & \text{else} \end{cases}$$

wherein Corr is the correlation value; W is an overlapping region between the first image and the second image under the camera motion; p and p' are overlapping points in the overlapping region from the first image and the second image, respectively; L(p) is a first Laplace gradient of the first point; L'(p') is a second Laplace gradient of the second point; G(p) is a first Sobel gradient of the first point; G'(p') is a second Sobel gradient of the second point; T is a first Sobel threshold for detecting an edge in the first image; and T' is a second Sobel threshold for detecting an edge in the second image;

(2) selecting a maximum correlation value from the plurality of correlation values for the camera motion;

(3) repeating (1) and (2) for other camera motions to generate maximum correlation values for the other camera motions;

(4) generating a map comprising the maximum correlation values at coordinates of their translation vectors; and (5) selecting a group of the maximum correlation values that form peaks in the map.

13. The method of claim 12, further comprising using a Laplace filter to generate the first and the second Laplace gradients, the Laplace filter comprising:

$$L(x, y) = I(x, y) - \frac{1}{9}\sum_{i=-1}^{1}\sum_{j=-1}^{1} I(x+i, y+j),$$

wherein L is a Laplace gradient and I is a pixel value.

14. The method of claim 13, further comprising using a Sobel filter to generate the first and the second Sobel gradients, the Sobel filter comprising:

$$g_x(x,y)=I(x+1,y-1)+2I(x+1,y)+I(x+1,y+1)-I(x-1,y-1)-2I(x-1,y)-I(x-1,y+1);$$

$$g_y(x,y)=I(x-1,y+1)+2I(x,y+1)+I(x+1,y+1)-I(x-1,y-1)-2I(x,y-1)-I(x+1,y-1);$$

$$G(x,y)=|g_x(x,y)|+|g_y(x,y)|;$$

wherein $g_x$ is a Sobel gradient in the x-direction, $g_y$ is a Sobel gradient in the y-direction, and G is a Sobel gradient in the x-direction and the y-direction.

15. The method of claim 14, wherein each of the peaks in the map comprises a point having a maximum correlation value (1) greater than or equal to all of its neighboring points, and (2) greater than at least one of the neighbor points.

16. The method of claim 15, further comprising:

(6) selecting from the group one camera motion having the largest matched edge count, wherein a matched edge count is defined as:

$$MEC = \sum_{p \in W} k(L(p), L'(p'), G(p), G'(p'))$$

$$k(L(p), L'(p'), G(p), G'(p')) = \begin{cases} 1, & \text{if } G(p) > T \text{ AND } G'(p') > T' \text{ AND } \frac{2L(p)L'(p')}{L^2(p)+L'^2(p')} \geq \frac{1}{3} \\ 0, & \text{else} \end{cases}$$

wherein MEC is the matched edge count.

17. The method of claim 16, further comprising:

(7) aligning the first image and the second image according to the selected camera motion.

* * * * *